United States Patent
Bauer et al.

(10) Patent No.: US 10,923,994 B2
(45) Date of Patent: Feb. 16, 2021

(54) METHOD FOR PRODUCING LAMELLAE FOR A LAMELLAE PACKAGE, IN PARTICULAR FOR ELECTRICAL MACHINES AND GENERATORS, DEVICE HAVING AT LEAST ONE PUNCH PRESS, AND LAMELLAE AND LAMELLAE PACKAGE PRODUCED ACCORDING TO THE METHOD

(71) Applicant: Kienle + Spiess GmbH, Sachsenheim (DE)

(72) Inventors: Steffen Bauer, Zaberfeld (DE); Björn Böker, Esslingen (DE)

(73) Assignee: Kienle + Spiess GmbH, Sachsenheim (DE)

( * ) Notice: Subject to any disclaimer, the term of this patent is extended or adjusted under 35 U.S.C. 154(b) by 718 days.

(21) Appl. No.: 15/101,945

(22) PCT Filed: Dec. 4, 2014

(86) PCT No.: PCT/EP2014/003253
§ 371 (c)(1),
(2) Date: Jun. 6, 2016

(87) PCT Pub. No.: WO2015/082076
PCT Pub. Date: Jun. 11, 2015

(65) Prior Publication Data
US 2016/0308425 A1    Oct. 20, 2016

(30) Foreign Application Priority Data
Dec. 6, 2013    (DE) .................. 10 2013 020 662

(51) Int. Cl.
*H01F 3/04* (2006.01)
*H01F 7/06* (2006.01)
(Continued)

(52) U.S. Cl.
CPC .......... *H02K 15/02* (2013.01); *B23K 26/0846* (2013.01); *B23K 26/38* (2013.01); *H02K 15/03* (2013.01)

(58) Field of Classification Search
CPC .... B23K 26/0846; B23K 26/38; H02K 15/03; H02K 15/02
See application file for complete search history.

(56) References Cited

U.S. PATENT DOCUMENTS 4,285,754 A    8/1981    DiMatteo
5,142,178 A *  8/1992    Kloster .................. H02K 1/16
                                              310/216.048
(Continued)

FOREIGN PATENT DOCUMENTS

CN    102 820 743    12/2012
DE    208 927        4/1984
(Continued)

*Primary Examiner* — Paul D Kim
(74) *Attorney, Agent, or Firm* — Gudrun E. Huckett

(57) ABSTRACT

The invention relates to a method for producing lamellae for a lamellae package, wherein the lamellae are punched from a metal strip by at least one punching die. At least one part of the contour of the lamella is produced by stream cutting. The method is carried out such that the lamella is still held in the metal strip. The lamella is punched out of the metal strip by the punching die. The stream cutting results in clean cutting edges, which do not require reworking of the lamella. The device for carrying out the method according to the invention has a stream cutting unit upstream of the punching press which has at least one stream cutting head. A wide variety of lamella contours can be cut out of the metal strip with high accuracy using said stream cutting unit.

12 Claims, 2 Drawing Sheets

(51) Int. Cl.
　　　*H02K 15/02*　　(2006.01)
　　　*B23K 26/38*　　(2014.01)
　　　*B23K 26/08*　　(2014.01)
　　　*H02K 15/03*　　(2006.01)

(56) References Cited

U.S. PATENT DOCUMENTS

| | | | | |
|---|---|---|---|---|
| 5,640,752 | A * | 6/1997 | Steiner | H01F 41/0233 |
| | | | | 29/564.1 |
| 6,168,099 | B1 * | 1/2001 | Hopf | F02M 51/0671 |
| | | | | 239/596 |
| 6,666,063 | B2 | 12/2003 | Pick et al. | |
| 8,986,803 | B2 * | 3/2015 | Yoshida | B31D 1/02 |
| | | | | 428/102 |
| 2005/0017587 | A1 * | 1/2005 | Koenig | H02K 1/278 |
| | | | | 310/156.19 |
| 2008/0087651 | A1 | 4/2008 | Pluss | |
| 2009/0001843 | A1 * | 1/2009 | Enomoto | H02K 1/145 |
| | | | | 310/257 |

FOREIGN PATENT DOCUMENTS

| | | |
|---|---|---|
| DE | 197 24 075 | 12/1998 |
| DE | 100 40 978 | 3/2002 |
| DE | 103 40 114 | 3/2004 |
| DE | 10 2004 060 078 | 7/2006 |
| EP | 2 279 808 | 2/2011 |
| JP | 2001321866 | 11/2001 |
| JP | 2012170187 | 9/2012 |
| WO | 04/034454 | 5/2002 |
| WO | 2008/092748 | 8/2008 |
| WO | 2010/046177 | 4/2010 |

* cited by examiner

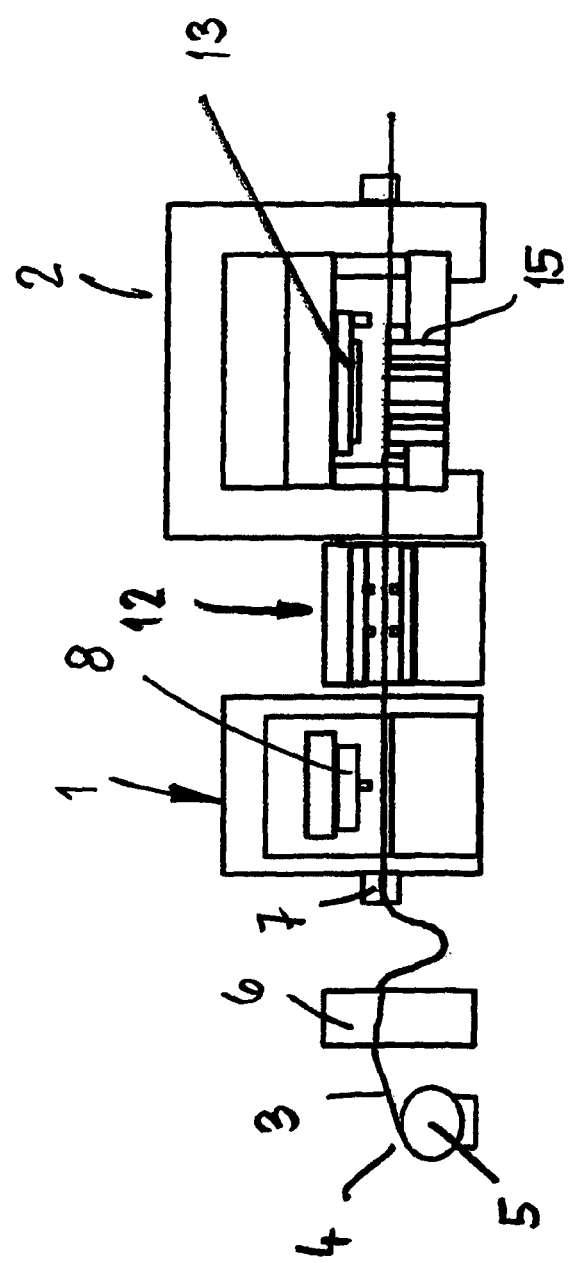

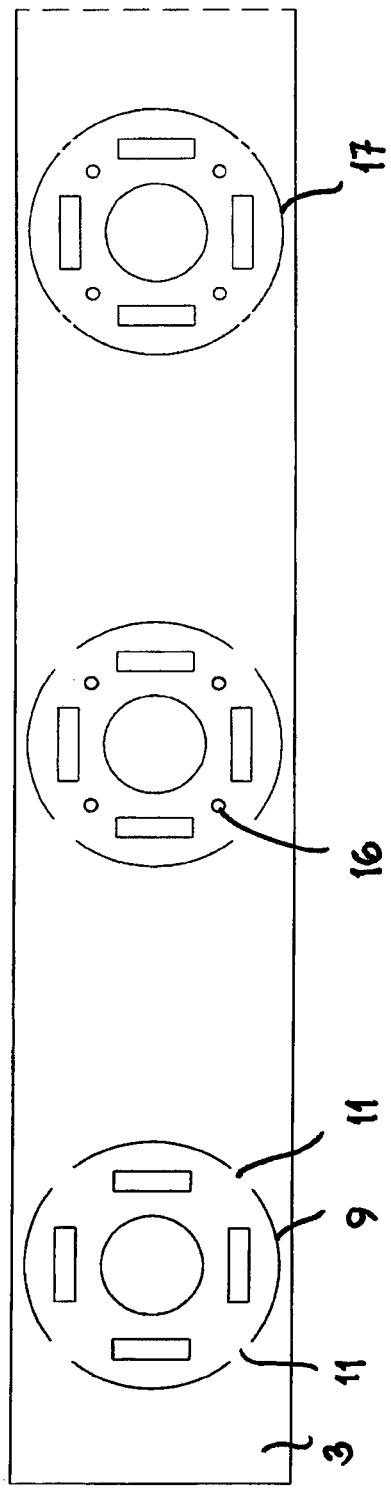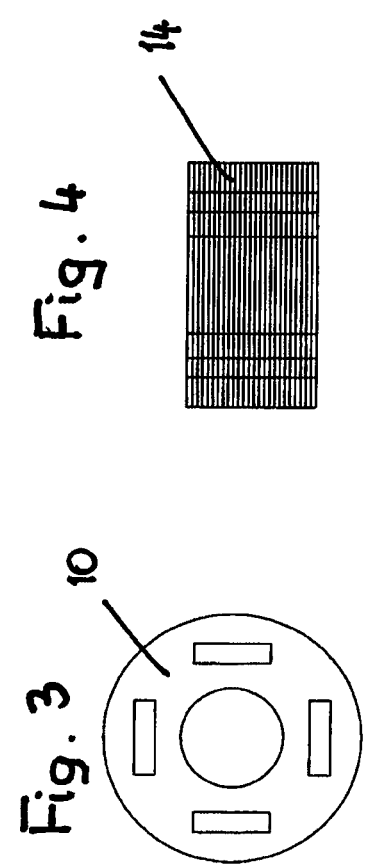

METHOD FOR PRODUCING LAMELLAE FOR A LAMELLAE PACKAGE, IN PARTICULAR FOR ELECTRICAL MACHINES AND GENERATORS, DEVICE HAVING AT LEAST ONE PUNCH PRESS, AND LAMELLAE AND LAMELLAE PACKAGE PRODUCED ACCORDING TO THE METHOD

BACKGROUND OF THE INVENTION

The invention relates to a method for producing lamellae (laminations) for a lamellae package (lamination pack), in particular for electric machines and generators, from a metal strip, in which the lamination is punched out of the metal strip by means of at least one punching tool, a device having at least one punch press which comprises at least one punching tool, in particular for carrying out the method, a lamellae (lamination) produced according to the method, and a lamellae package (lamination pack) produced according to the method.

Core stacks made up of stacked laminations which are produced from cut electric steel sheets are frequently used in electric machines. Such lamination packs are used, for example, for rotors and/or stators of electric motors. A metal strip is unwound from a reel and fed into a punch press. It comprises at least one punching tool with which the contours of the lamination are punched in one or more stations and one or more tracks. The laminations produced in this way may be stacked to form the lamination pack inside and outside the punching tool, and joined together within the lamination pack. A separate punching tool is necessary in each case for different contours of the laminations. Such punching tools are expensive, and exchanging them requires standstill of the punch press.

It is also known to convey the metal strip into a laser unit and to cut the contours of the lamination in one or more stations within a laser cutting machine. The cut-out laminations are then individually removed and assembled to form the pack outside the laser unit. Such an operation is likewise complicated and cost-intensive.

The object of the invention is to design the method of the aforementioned kind, the device of the afore mentioned kind, the lamination, and the lamination pack in such a way that simple production of the lamination, even with different contours, is possible.

SUMMARY OF THE INVENTION

This object is achieved for the method of the aforementioned kind in accordance with the invention in that at least a portion of the contour of the lamination is created by jet or cutting and in that the lamination is subsequently punched out with the punching tool, for the device of the aforementioned kind in that the device includes at least one jet cutting unit arranged upstream of the punch press and comprising at least one beam cutting head, for the lamination and for the lamination pack in that the contour of the lamination is created by jet cutting.

In the method according to the invention, initially the contour of the lamination is created, at least partially, by jet cutting in the metal strip. In this context, the method is carried out in such a way that the lamination is still held in the metal strip so that it does not fall down from the metal strip. The lamination is punched out of the metal strip by means of the punching tool. Since the contour or also a partial contour of the lamination is created by jet cutting, the lamination has very clean cutting edges which do not require reworking of the lamination. Of course, after it has been punched out, the lamination may still be reworked on its cutting, edge should this be necessary with regard to very high accuracy requirements. Since the lamination is still connected to the metal strip after jet cutting, it is transported underneath the punching tool and only then detached from the metal strip. In this way, the lamination packs can be formed from the laminations very easily, cost-effectively, and in a short period of time.

It is advantageous when the entire contour, with the exception of connecting points of the lamination to the metal strip, is created by jet cutting.

By means of the punching tool, further contours may be cut, and/or the lamination having the contours created by jet cutting, may be cut out of the metal strip.

The laminations are advantageously stacked to form a lamination pack after having been cut out of the metal strip. A packetizing unit, necessary for this purpose, for applying or introducing the connecting elements is advantageously situated between the jet cutting unit and the punch press.

The laminations are advantageously produced in one track of the metal strip. In this case, a narrow strip is preferably used as the metal strip. A narrow strip is to be understood as a metal strip which is produced from a wide strip by lengthwise slitting (shear cutting). The narrow strip is present as a coil prior to processing in the punching process. The width of the narrow strip is geared to the dimensions of the product to be produced therefrom.

However, it is also possible to produce the laminations in at least two tracks of the metal strip. A wide strip is then advantageously used as the metal strip. A wide strip is a metal strip whose width results from the manufacturing process. In the delivered state, the wide strip is wound to a coil. The edges of the wide strip may already be trimmed by the manufacturer. A common, typical width of a wide strip for producing laminations for electric machines or generators is approximately 1,200 mm.

In addition to the at least one punch press, the device according to the invention comprises at least one jet cutting unit upstream of the punch press. It comprises at least one jet cutting head with which the contour of the lamination may be reliably cut. By means of the jet cutting head, even very complicated contours may be satisfactorily cut from the metal strip with high precision. In addition, use of the jet cutting head offers the advantage that a wide variety of contours may be created in direct succession in a metal strip, since it is only necessary to change the program control for the jet cutting head.

To ensure proper processing, a straightening apparatus is advantageously provided upstream of the jet cutting unit.

In one preferred embodiment, the punch press is provided with at least one stacking station for stacking the laminations. Inside the punch press the tool may then be used to eject the lamination from the metal strip into the stacking station.

The lamination according to the invention is characterized in that its contour is created by jet cutting. Thus, the contour has no punch indentations, no cut surfaces, no fractures, and also no burrs, as is generally the case when the laminations are produced by punching.

The subject matter of the application results not only from the subject matter of the individual claims, but also from all disclosures and features disclosed in the drawings and the description. Even if they are not subject matter of the claims, they are claimed as essential to the invention, provided that, individually or in combination, they are novel with respect to the prior art.

Additional features of the invention result from the further claims, the description, and the drawings.

The invention will be explained in greater detail with the aid of one exemplary embodiment illustrated in the drawings. It is shown in:

BRIEF DESCRIPTION OF THE DRAWINGS

FIG. 1 in a schematic illustration a device according to the invention for carrying out the method according to the invention, FIG. 2 a plan view of a strip passing through the device according to FIG. 1, FIG. 3 a plan view of a lamination, FIG. 4 a cross-section of a lamination pack.

DESCRIPTION OF PREFERRED EMBODIMENTS

The device has a jet cutting unit 1 in the form of a laser beam cutting unit, and a downstream punch press 2. A metal strip 3, which may be a wide strip or a narrow strip, is transported through the device. The metal strip 3 is wound to a coil 4 which is rotatably supported on an unwinder 5. The metal strip 3 is optionally transported through a straightening apparatus 6 in which the metal strip 3 is straightened. With the aid of a feed apparatus 7, the metal strip 3 is subsequently supplied to the jet cutting unit 1. It comprises at least one laser beam cutting head 8 with which defined contours 9 can be cut in the metal strip 3 by program control. The connecting elements 16 necessary for forming a lamination pack 14 are optionally applied to the metal strip 3 or introduced into the metal strip 3 in the packetizing unit 12. In the downstream punch press 2, the lamination 10 containing the contour 9 is punched out of the metal strip 3*a* by means of a punching tool 13. To prevent the laminations 10 from falling out from the metal strip 3 prior to the cutting-out operation in the punch press 2, they are held and positioned by one or more connecting points 11 in the metal strip 3.

A $CO_2$ laser is advantageously used as a radiation source, with which the particular contours 9 may be reliably cut in the metal strip 3 with great accuracy.

As is apparent from FIGS. 1 and 2, the metal strip 3 is transported in its longitudinal direction through the jet cutting unit 1 and the punch press 2.

The desired contours 9 of the laminations 10 to be punched out are precisely created by means of the jet cutting unit 1. By means of the laser beam cutting head 8, very complicated contours may be cut out of the metal strip 3 with great accuracy. The successive contours in the metal strip 3 may have different shapes since the laser beam cutting head 8 via program control is able to travel any path in the jet cutting unit 1 required for creating the different contours. In contrast to punching tools, in which a different tool is required for each different contour, any suitable contour may be cut into the metal strip 3 in succession in an extremely cost-effective manner by means of the jet cutting unit 1.

During creation of the contour in the jet cutting unit 1, the metal strip 3 is advantageously standing still so that a clean cut can be created. While the laser beam cutting head 8 travels along its paths during the beam cutting operation by program control, at the same time a lamination 10 having a contour 9 previously created in the jet cutting unit 1 is punched out of the metal strip 3 in the punch press 2 by means of a punching tool 13.

The connecting elements 16 necessary for forming a lamination pack 14 are applied on the metal strip 3 or introduced into the metal strip 3 by means of the packetizing unit 12. The lamination 10 is ejected from the metal strip 3 in the punch press 2 by means of a punching tool 13. In FIG. 2, the punch outline 17 of the punching tool 13 is denoted by a broken-line contour element. The lamination 10 is pushed downwardly by the punching tool 13 into a stacking station 15 in which the laminations 10 are stacked to form packs. Such a lamination pack 14 is illustrated in FIG. 4 by way of example. The superposed punched-out laminations may be mechanically joined together, for example, by rods which pass through the laminations. Also, the laminations may be provided with knob-like elevations with which the laminations engage in a form-fit manner corresponding indentations in the adjacent lamination. It is also possible to provide the laminations with recesses and protruding tabs which engage the recesses in the respective adjacent lamination. In this context, the width of the tabs may be less than the width of the openings, measured in the circumferential direction. This provides the option of correspondingly rotating adjacent laminations relative to one another within the pack. In the described embodiments, the superposed laminations are suitably fixedly connected to one another, for example, by rods passing through the pack. The pack is held on the rods in a known manner.

The individual laminations of the pack 14 may also be welded together or also glued to one another.

The connection of the individual laminations within the pack 14 may be carried out inside the punch press 2 but also outside thereof in a separate processing station.

The device is characterized in that the geometry of the laminations, or at least portions of the lamination geometry, are produced with the jet cutting unit 1. The punch press 2 is then used only for separating the laminations 10 from the metal strip 3 and for stacking the punched-out laminations 10 within the stacking station 15 to form the lamination pack 14.

A narrow strip is advantageously used as the metal strip 3. The jet cutting unit 1 may thus have a small size so that the device is characterized by a compact configuration. By means of the laser beam cutting head 8, the desired contours of the laminations can be cut out of the metal strip 3 with great accuracy. Even fairly complicated shapes may be produced very accurately by means of the laser beam cutting head 8. The resulting, edges of the laminations 10 are characterized by clean cut surfaces. In comparison to punched laminations, punch indentations, fractures, or burrs on the cut surfaces are not to be expected.

Since the laser beam cutting head 8 is moved by program control, a wide variety of contours, if this should be required, may be cut out of the metal strip 3 within a very short time. It is necessary only to load the appropriate program so that the laser beam cutting head 8 performs the desired movements across the metal strip 3.

In the preferred use of a narrow strip as the metal strip 3, the laminations 10 are cut out of the metal strip 3 in succession in one track, as is apparent from FIG. 2. Of course, a wide strip may also be used as the metal strip 3. In that case, the laminations 10 may also be cut out of the metal strip 3 next to one another in two or more tracks. The same, but also different, laminations may be cut in the various tracks. Only the single laser beam cutting head 8 is necessary for the differently shaped laminations. Of course, the jet cutting unit 1 may also comprise two or more laser beam cutting heads 8. Such a design is expedient when, for example, two or more metal strips 3 are conveyed next to one another through the jet cutting unit 1 and the punch press 2 or the laminations 10 are produced in two or more tracks in the metal strip 3.

It is also possible that, for example, two laser beam cutting heads 8 next to one another cut out the laminations from a metal strip 3 having an appropriate width. A very high output of the device can be achieved in this way.

The described device and the described method are used for producing lamination stacks 14 for rotors and/or stators of electric machines or generators. The device and the method can also be used to produce lamination stacks for other applications. In this case, other beam cutting processes besides laser cutting are conceivable

What is claimed is:

1. A method for producing laminations for a lamination pack, the method comprising:
    jet cutting an entire contour of the laminations in a metal strip, with the exception of connecting points of the laminations to the metal strip, wherein the metal strip is standing still during jet cutting;
    while jet cutting said entire contour of a first one of the laminations, punching at the same time a second one of the laminations with said entire contour, previously created by jet cutting, out of the metal strip by a punching tool by separating the connecting points of the second one of the laminations from the metal strip with the punching tool to separate the second one of the laminations from the metal strip; and
    stacking in a stacking station the laminations, separated from the metal strip by punching, to form the lamination pack by pushing the laminations with the punching tool into the stacking station.

2. The method according to claim 1, further comprising producing several of the laminations in one track of the metal strip.

3. The method according to claim 1, further comprising producing several of the laminations in at least two tracks of the metal strip.

4. The method according to claim 1, wherein the metal strip is a narrow strip.

5. The method according to claim 1, wherein the metal strip is a wide strip.

6. A device for performing the method of claim 1, the device comprising:
    at least one punch press comprising at least one punching tool;
    at least one jet cutting unit upstream of the at least one punch press and comprising at least one beam cutting head, the at least one jet cutting unit configured to jet cut an entire contour of a lamination in a metal strip, with the exception of connecting points of the lamination to the metal strip;
    wherein the at least one punch press comprises at least one stacking station, wherein the at least one punching tool is configured to punch the lamination out of the metal strip by separating the connecting points of the lamination from the metal strip to separate the lamination from the metal strip and to push the lamination, separated from the metal strip by the punching tool, into the stacking station configured to stack the laminations to form the lamination pack.

7. The device according to claim 6, further comprising a straightening apparatus upstream of the at least one jet cutting unit.

8. The device according to claim 6, further comprising a feed apparatus upstream of the at least one jet cutting unit.

9. The device according to claim 6, further comprising an unwinder upstream of the at least one jet cutting unit.

10. The device according to claim 6, further comprising a packetizing unit upstream of the at least one punch press.

11. A lamination produced by the method according to claim 1, wherein the entire contour of the lamination is created by jet cutting in the metal strip, with the exception of connecting points of the lamination to the metal strip.

12. A lamination pack comprised of laminations produced according to the method of claim 1, wherein the entire contour of the laminations is created by jet cutting in the metal strip, with the exception of connecting points of the laminations to the metal strip.

* * * * *